(12) United States Patent
Sjögren et al.

(10) Patent No.: US 8,689,965 B2
(45) Date of Patent: Apr. 8, 2014

(54) SYSTEM FOR ROTATING A NUMBER OF PACKAGES

(75) Inventors: Magnus Sjögren, Tjörnarp (SE); Jessica Elmehav, Helsingborg (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 13/496,510

(22) PCT Filed: Sep. 6, 2010

(86) PCT No.: PCT/SE2010/000217
§ 371 (c)(1),
(2), (4) Date: May 24, 2012

(87) PCT Pub. No.: WO2011/034478
PCT Pub. Date: Mar. 24, 2011

(65) Prior Publication Data
US 2012/0228085 A1    Sep. 13, 2012

(30) Foreign Application Priority Data
Sep. 17, 2009    (SE) ........................................ 0901194

(51) Int. Cl.
*B65G 47/24*    (2006.01)
(52) U.S. Cl.
USPC ....................................................... 198/415
(58) Field of Classification Search
USPC ................................... 198/415, 400, 401, 411
See application file for complete search history.

(56) References Cited

U.S. PATENT DOCUMENTS

| | | | | | |
|---|---|---|---|---|---|
| 2,732,927 | A | * | 1/1956 | Hansen | 198/415 |
| 3,047,123 | A | * | 7/1962 | McKay | 198/415 |
| 4,676,361 | A | | 6/1987 | Heisler | |
| 4,807,739 | A | * | 2/1989 | Wolf et al. | 198/415 |
| 6,164,431 | A | * | 12/2000 | Morisod | 198/415 |
| 7,552,815 | B2 | * | 6/2009 | Pahud | 198/413 |
| 2006/0163035 | A1 | | 7/2006 | Pahud | |

FOREIGN PATENT DOCUMENTS

| | | |
|---|---|---|
| CN | 1781828 A | 6/2006 |
| CN | 201140924 Y | 10/2008 |
| CN | 101492125 A | 7/2009 |
| EP | 1180484 A2 | 2/2002 |
| EP | 1 829 802 A1 | 9/2007 |
| GB | 1156756 | 7/1969 |
| GB | 2 144 698 A | 3/1985 |
| JP | 2010-100398 A | 5/2010 |
| WO | WO 2008/075319 A2 | 6/2008 |

OTHER PUBLICATIONS

International Search Report (PCT/ISA/210) issued on Jan. 17, 2011, by the Swedish Patent Office as the International Searching Authority for International Application No. PCT/SE2010/000217.

(Continued)

*Primary Examiner* — James R Bidwell
(74) *Attorney, Agent, or Firm* — Buchanan Ingersoll & Rooney PC

(57) ABSTRACT

A conveyor belt system is provided for enabling rotation of a number of packages, such that every second package is rotated clockwise, and every other package is rotated counter clockwise. A computer program product is also provided.

19 Claims, 3 Drawing Sheets

(56) References Cited

OTHER PUBLICATIONS

Office Action (Notification of the First Office Action) issued on Dec. 19, 2013, by the State Intellectual Property Office of P. R. C. In corresponding Chinese Patent Application No. 200910253710.4, and an English Translation of the Office Action. (11 pages).

* cited by examiner

SYSTEM FOR ROTATING A NUMBER OF PACKAGES

FIELD OF THE INVENTION

This invention pertains in general to the field of conveyor belt assemblies for a distribution packaging line. More particularly, the invention pertains to a conveyor belt assembly for rotating a number of packages in a predetermined matter.

BACKGROUND OF THE INVENTION

Conveyor belt assemblies are used to transport packages from one point to another. Conveyor belt assemblies may also be used to transport packages for subsequent secondary packaging. For example, by placing a package container at the end of the conveyor belt assembly, each package travelling on the belt may drop into the package container.

Commonly, at least at the beginning of the conveyor belt assembly each package travels one after another on the conveyor belt. However, in order to increase the packaging efficiency, and packaging robustness, it is advantageous to group a number of packages on the conveyor belt assembly before the actual packaging into the package container occurs.

However, in order to increase the packaging efficiency, such as number of packages per volume unit, and packaging robustness, such that the packages packed in the package container are protected in the best possible way during transport, there is a need for being able to control the mutual positioning of each package of a group.

Hence, an improved system for grouping a number of packages would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a system according to the appended patent claims.

An idea of the invention is to provide a conveyor belt system enabling rotation of a number of packages, such that every second package is rotated clockwise, and every other package is rotated counter clockwise. Other turning schemes are possible depending on the packing pattern in the secondary package. If the package is wedge shaped, and four packages in width are going to be stacked on top of each other, it is necessary to turn them counter-clockwise (CCV), clockwise (CV), CCV, CV, CV, CCV, CV, CCV, CCV, CV, CCV, CV . . . with a cycle length of four packages. This will lead to the most effective packing pattern in the secondary box.

According to an aspect a conveyor belt system is provided. The conveyor belt system comprises a first conveyor belt, a second conveyor belt adjacently aligned next to the first conveyor belt, a third conveyor belt adjacently aligned after the first conveyor belt, and a fourth conveyor belt adjacently aligned after the second conveyor belt and next to the third conveyor belt. The conveyor belt system further comprises a control unit configured to control the belt speed of each conveyor belt, such that an object entering the system at the first conveyor belt and second conveyor belt may be rotated in a certain direction before exiting the system at the third conveyor belt and the fourth conveyor belt.

According to another aspect a method is provided. The method comprises a first step for controlling the belt speed of: a first conveyor belt initially being driven at a first speed; a second conveyor belt adjacently aligned next to the first conveyor belt, initially being driven at a second speed; a third conveyor belt adjacently aligned after the first conveyor belt, initially being driven at the second speed; and a fourth conveyor belt adjacently aligned after the second conveyor belt and next to the third conveyor belt, initially being driven at the first speed. The method further comprises a second step for changing the belt speed of the first conveyor belt to the second speed, and the belt speed of the second conveyor belt to the first speed, when a first object sensor positioned before the first conveyor belt and second conveyor belt, detects an object. A computer program product stored on a computer-readable medium comprising a computer program for execution on a data-processing apparatus for carrying out the method is also provided.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

The following description focuses on an embodiment of the present invention applicable to conveyor belt assemblies for a distribution packaging line and in particular to a system for grouping a number of packages.

Figure 1A:
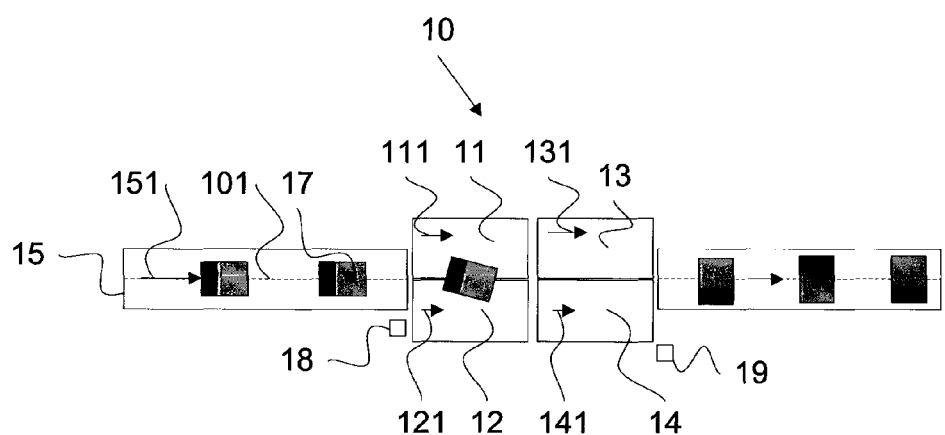
FIGS. 1a and 1b are an illustration showing a system according to an embodiment.
Figure 1B:
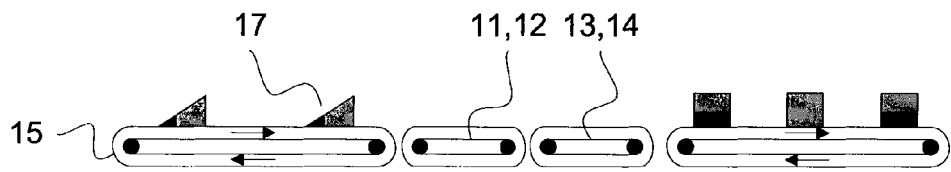

In an embodiment, according to FIGS. 1a and 1b, a conveyor belt system 10 is provided. FIG. 1a illustrates a top view of the system and FIG. 1b illustrates a side view of the system. The system comprises two symmetrically aligned conveyor belts assemblies 11, 12, also referred to as first conveyor belt assembly 11 (belt 11) and second conveyor belt assembly 12 (belt 12).

In use, belt 11 and belt 12 are positioned such that a package 17, optionally exiting another belt assembly 15 will travel onto both of belt 11 and belt 12. As such, belt 11 and belt 12 are adjacently aligned to each other, as well as optionally aligned in relation to the centre line 101 of belt assembly 15.

The system further comprises a third (belt 13) conveyor belt assembly 13 and fourth (belt 14) conveyor belt assembly 14 positioned adjacently and aligned with belt 11 and belt 12, such that belt 13 is aligned with belt 11, and belt 12 is aligned with belt 14.

Belt 11, belt 12, belt 13, and belt 14 may be essentially horizontally aligned, as is indicated in FIG. 1b, such that the package optionally exiting belt assembly 15 easily will travel onto the belt 11 and belt 12, and then further onto belt 13 and belt 14.

Each of belt 11, belt 12, belt 13, and belt 14 may be driven by a separate motor for transporting a package 17 from one end to the other.

Each of belt 11, belt 12, belt 13, and belt 14 may be driven at individual belt speeds, i.e. independently of the belt speeds of the other belt assemblies.

In an embodiment the system further comprises a first package sensor 18 positioned before belt 11 and belt 12.

In an embodiment the system also comprises a second package sensor 19 positioned after belt 13 and belt 14.

Each package sensor 18, 19 may be any sensor suitable for detecting when an object passes the sensor, e.g. a photocell or an Infrared (IR) sensor detecting when an object passes the location of the package sensor 18, 19.

The system further comprises a control unit (not shown in FIGS. 1a and 1b) to monitor each package sensor and the speed of each of belt 11, belt 12, belt 13, and belt 14.

FIG. 1a is an illustration showing the optional conveyor belt assembly 15 and the system according to an embodiment. The conveyor belt 15 may be configured to transport a package 17 from one end to the other, by means of driving the conveyor belt e.g. in a forward direction, indicated by arrow 151 in FIG. 1. Belt 11 and belt 12, and belt 13 and belt 14 respectively may be symmetrically aligned to the optional belt assembly 15 such that when a package exits conveyor belt 15, the package travels onto both belt 11 and belt 12, and then further on to belt 13 and belt 14.

In an embodiment, the system comprising belt 11 to belt 14 is configured to turn each package +90 degrees or −90 degrees in relation to the original configuration of each package entering the system, e.g. such as the configuration of each package exiting the optional conveyor belt assembly 15.

In an embodiment the system is configured such that every second package is rotated +90 degrees and every other package is rotated −90 degrees, as is indicated in FIG. 1a. This configuration of packages exiting the system may according to this embodiment be advantageous for subsequent packaging of the packages. Other turning schemes are possible depending on the packing pattern in the subsequent secondary package. If the package is wedge-shaped, and four packages in width are going to be stacked on top of each other, it is necessary to turn them counter-clockwise (CCV), clockwise (CV), CCV, CV, CV, CCV, CV, CCV, CCV, CV, CCV, CV . . . with a cycle length of four packages. This will lead to the most effective packing pattern in the secondary box.

For example, before a package is detected by the first package sensor 18, belt 11 may be driven at a first speed. Belt 12 may be driven at a second speed, indicated by arrow 121 in FIG. 1a. Belt 13 may be driven at the second speed, indicated by arrow 131 in FIG. 1a. Belt 14 may be driven at the first speed, indicated by arrow 141 in FIG. 1a. The speed difference between belt 11 and belt 12 can be called d1, and the speed difference between belt 13 and belt 14 is called d2. When the first package sensor 18 detects the first package 17, the speed difference between belt 11, indicated by the arrow 111 in FIG. 1a, and belt 12, indicated by the arrow 121 in FIG. 1a, will change sign by means of the control unit. This means that the belt pair now will turn a package in the opposite direction, compared to before the speed adjustment.

The speed of belt 11 is changed from the first speed to the second speed. The speed of belt 12 is changed from the second speed to the first speed.

Since the speeds of belt 11 and belt 12, and the speeds of belt 13 and belt 14, respectively, are different, each package will be rotated in an amount related to the relative speed difference between belt 11 and belt 12, and belt 13 and belt 14, respectively.

For example, if the second speed 120 is larger than the first speed 100, and belt 11 is located to the left (with regard to the package travel direction) of belt 12, the package will rotate clockwise since the speed of belt 11 is larger than the speed of belt 12. Conversely, if the second speed 120 is lower than the first speed 100, the package will rotate counter clockwise since in such a case the speed of belt 11 is lower than the speed of belt 12.

After a package has been detected by the package sensor 18, belt 11 and belt 13 will be driven at the same second speed 120, and belt 12 and belt 14 will be driven at the same first speed 100. Thus, when the second speed 120 is larger than the first speed, and belt 11 and belt 13 are located to the left of belt 12 and belt 14, respectively, with regard to the package travel direction, the package will be rotated clockwise.

The degree of rotation is controlled by the relative speed difference of belt 11 and B, and belt 13 and belt 14 respectively.

When leaving belt 13 and belt 14 the second package sensor 19 will detect the package 19. The control unit is then configured to change the speed on belt 13 from the second speed 120 to the first speed 100 and the speed of belt 14 from the first speed 100 to the second speed 120.

Hence, in this situation belt 11 and belt 14 will be driven at the same speed and belt 12 and belt 13 be driven at the same speed.

When the first package sensor 18 detects a second package 17b optionally arriving from conveyor belt 15, the control unit will change the speed of belt 11 from the second speed 120 to the first speed 100 and the speed of belt 12 from the first speed 100 to the second speed 120.

Accordingly, once the first package 17 has exited belt 13 and belt 14, and when the first package sensor 18 detects a second package 17b, this means that belt 11 and belt 13 will be driven at the first speed 100 and belt 12 and belt 14 will be driven at the second speed 120. In this way, when the second speed 120 is larger than the first speed 100, the second package 17b will be turned counter clockwise.

It should be appreciated that the control unit may be configured to rotate each package at any degree of rotation. For example, a first package may be rotated 45 degrees compared to its original orientation. Subsequently, the second package may be rotated 90 degrees compared to its original orientation.

In an embodiment, the system is configured to rotate every second package of a package group +90 degrees in relation to the original package orientation, and every second package of a package group −90 degrees in relation to the original package orientation. For example, if each package group comprises 4 packages, package number 1 and package number 3 in the first package group may be rotated +90 degrees, and package number 2 and 4 in the first package group may be rotated −90 degrees. Package number 5, which is the first package in group number 2, may be rotated −90 degrees, and package number 6 may be rotated +90 degrees, etc. Hence the first package in a second package group may be rotated to the same degree as the last package in the first package group. Thus, package number 1, 3, 6, 8, 9, 11, 14, etc, will be rotated at the same degree, e.g. +90 degrees in relation to the original package orientation. Consequently, package number 2, 4, 5, 7, 10, 12, 13, etc, will be rotated at the same degree, e.g. −90 degrees in relation to the original package orientation.

In another embodiment, when e.g. grouping four Tetra Wedge Aseptic (TWA) packages, the first and fourth package in each group is rotated at the same degree of rotation. Moreover, the first package in each latter group is rotated at the same degree of rotation as the fourth package in the former package group. Hence, package number 1, 4, 5, 8, 9, 12, 13, etc, will be rotated at the same degree of rotation, e.g. +90 degrees in relation to the original package orientation. Consequently, package number 2, 3, 6, 7, 10, 11, 14, 15, etc. will be rotated at the same degree of rotation, e.g. −90 degrees in relation to the original package orientation.

In an embodiment, wherein the original package orientation differs, the system and control unit is configured to rotate the each package such that a desired final degree of rotation is obtained. For example, if every second package entering the system has an orientation, which is rotated +30 degrees in relation to every other package entering the system, the control unit may be configured to rotate every second package +60 degrees in relation to the package's original orientation, and every other package −90 degrees in relation to the package's original orientation. Hence, depending on the original orientation of the packages entering the system, the control unit may be configured to rotate each package at any degree of rotation depending on the package's original orientation.

Two Packages Simultaneously in the System

In an embodiment, the first package sensor 18 may detect the second package 17b before the first package 17 has exited belt 13 and belt 14. As mentioned above, the control unit by detection of the second package 17b changes the speed of belt 11 and belt 12, resulting in that belt 11 and belt 14 will have the same speed, while belt 12 and belt 13 will have the same speed. Once the first package has exited belt 13 and belt 14, by detection of the second package sensor, the control unit changes the speed of belt 13 and belt 14 such that belt 13 will have the same speed as belt 11 and Belt 14 will have the same speed as belt 12. In this way high throughput of rotating packages is achieved, and accordingly one package may be rotated clockwise/counter clockwise at belt 11 and belt 12 simultaneously as another package is rotated counter clockwise/clockwise at belt 13 and belt 14.

An advantage of utilizing four belts is that it surprisingly allows for substantially reduced distance between the packages.

In principle the distance between each package to be rotated may be zero, even for higher belt speeds.

Empirically, the present inventors have surprisingly found that the lower belt speed the better rotation result. Also, the lower relative belt speed difference between belts A, B, C, and D, respectively, the better rotation result.

Utilizing four belts also enables the possibility of programming the control unit to rotate each package in any degree rotation, i.e. in any angle with regard to the original configuration, while keeping the distance between the packages small. The small distance between the packages allows for higher throughput of packages, and consequently more rotated packages per time unit.

In an embodiment more than four belts are utilized, providing for even smaller distances between the packages to be rotated.

In this way every second package may be rotated clockwise and every other package be rotated counter clockwise in any desired degree depending on the relative speed difference between belt 11 and belt 12, and belt 13 and belt 14, respectively.

Figure 2A:
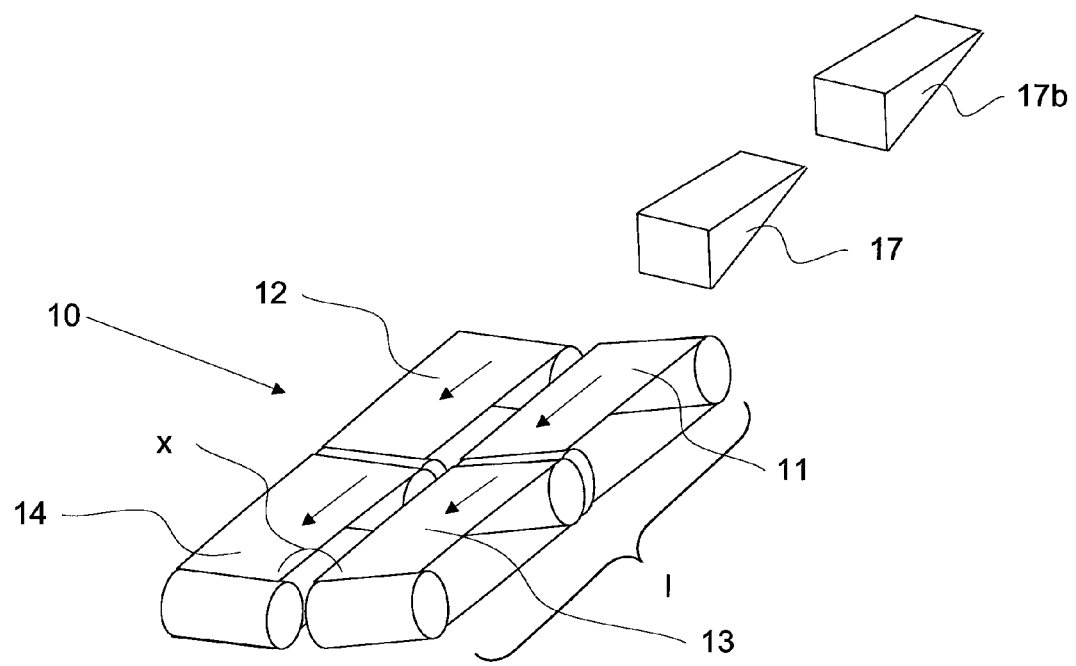
FIG. 2a is an illustration showing a system according to an embodiment.

FIG. 2 illustrates a 3D view of the system according to an embodiment.

In an embodiment, belt 11 and belt 12, and belt 13 and belt 14 respectively, are adjacently mounted at an angle x. The angle x is indicated in FIG. 2. The angle x may be determined based on the outer dimensions or shape of each package. For example, for a package having a triangular shape, seen from a side view, the angle x may be set higher or lower than a package having a rectangular parallelepiped shape, seen from a side view. The value of angle x is determined such that the rotation of each package is performed as reliably as possible.

In an embodiment the angle x is 180°.

In an embodiment the angle x is approximately 176°.

In an embodiment the angle x is lower than 176°. The actual speed value of the first speed and second speed may be changed such that the package travels at a suitable speed, while simultaneously being rotated a predetermined angle when travelling from the beginning of belt 11 and belt 12 to the end of belt 13 and belt 14.

In an embodiment the relative speed difference, e.g. between belt 11 and belt 12, is determined such that the rear end of the package catch up with the front end of the package over the length l, as indicated in FIGS. 1a and 1b, of belt 11 and belt 13, and belt 12 and belt 14, respectively. In this way the package will turn 90 degrees in relation to its original configuration before entering belt 11 and belt 12.

The length l is determined such that each package may be rotated smoothly, without slipping towards the belt surface.

In an embodiment, each belt is provided with a material, enabling friction towards the package. The material may be a plastic or rubber material.

The control unit may be any unit normally used for performing the involved tasks, e.g. a hardware, such as a processor with a memory.

Figure 3:
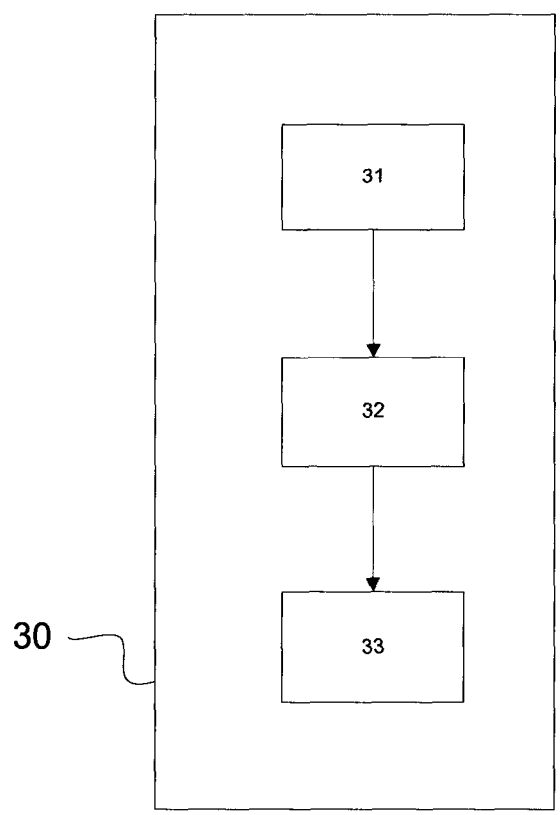
FIG. 3 is a block diagram of a computer program product according to an embodiment.

In an embodiment, according to FIG. 3, a computer program product stored on a computer-readable medium comprising a computer program for execution on a data-processing apparatus is provided. The computer program comprises a first code segment 31 for controlling the belt speed of: a first conveyor belt 11 initially being driven at a first speed; a second conveyor belt 12 adjacently aligned next to the first conveyor belt 11, initially being driven at a second speed; a third conveyor belt 13 adjacently aligned after the first conveyor belt 11, initially being driven at the second speed; and a fourth conveyor belt 14 adjacently aligned after the second conveyor belt 12 and next to the third conveyor belt 13, initially being driven at the first speed. The computer program further comprises a second code segment 32 for changing the belt speed of the first conveyor belt 11 to the second speed, and the belt speed of the second conveyor belt 12 to the first speed, when a first object sensor 18 positioned before the first conveyor belt 11 and second conveyor belt 12, detects an object.

In an embodiment, the computer program further comprises a third code segment 33 for changing the belt speed of the third conveyor belt 13 to the first speed, and the belt speed of the fourth conveyor belt 14 to the second speed, when a second object sensor 19 positioned after the third conveyor belt 13 and fourth conveyor belt 14, detects an object.

In an embodiment, the computer program is implemented in the software on the control unit for controlling the system according to some embodiments.

According to an embodiment, the computer program comprises code segments for performing the functionality of the system according to some embodiments.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A conveyor belt system comprising:
   a first conveyor belt;
   a second conveyor belt adjacently aligned next to the first conveyor belt;
   a planar conveying surface of the first conveyor belt forming an angle of less than 180 degrees with a planar conveying surface of the second conveyor belt;
   a third conveyor belt adjacently aligned downstream of the first conveyor belt;
   a fourth conveyor belt adjacently aligned downstream of the second conveyor belt and next to the third conveyor belt; and
   a control unit configured to control the belt speed of each conveyor belt, such that an object entering the system at the first conveyor belt and second conveyor belt may be rotated at a certain degree with regard to the travel direction of each conveyor belt before exiting the system at the third conveyor belt and the fourth conveyor belt.

2. The conveyor belt system according to claim 1, wherein the first, second, third, and fourth conveyor belts have parallel conveying directions.

3. The conveyor belt system according to claim 1, further comprising a first object sensor for detecting passage of an object, said first sensor being positioned before the first conveyor belt and second conveyor belt, and wherein the control unit is configured to adjust the belt speed of both the first conveyor belt and second conveyor belt when the first object sensor detects an object.

4. The conveyor belt system of claim 3, wherein the control unit is further configured to adjust the belt speed of both the first conveyor belt and second conveyor belt according to a preset packing pattern, when the first object sensor detects an object.

5. The conveyor belt system according to claim 1, further comprising a second object sensor for detecting passage of an object, said second object sensor being positioned after the third conveyor belt and fourth conveyor belt, and wherein the control unit is configured to adjust the belt speed of both the third conveyor belt and fourth conveyor belt when the second object sensor detects an object.

6. The conveyor belt system of claim 5, wherein the control unit is further configured to adjust the belt speed of both the third conveyor belt and fourth conveyor belt according to a preset packing pattern, when the second object sensor detects an object.

7. The system according to claim 1, wherein control unit is configured to rotate every other object, in a packing pattern, +90 degrees and every other object −90 degrees, in relation to an orientation of each object entering the system.

8. The conveyor belt system according to claim 1, wherein at most one object is located on the first conveyor belt and second conveyor belt, and at most one object is located on the third conveyor belt and fourth conveyor belt, at each point in time.

9. The conveyor belt system according to claim 1, wherein the third conveyor belt and the fourth conveyor belt are mounted at an angle defined between upper planes of the third conveyor belt and the fourth conveyor belt.

10. The conveyor belt system according to claim 1, wherein the angle is selected in the range from 165 to 179 degrees.

11. The conveyor belt system according to claim 1, wherein a relative speed difference of the first and second speed is determined based on the length of the first conveyor belt and third conveyor belt or second conveyor belt and fourth conveyor belt.

12. The conveyor belt system according to claim 1, wherein the control unit is configured to rotate every other object at a first degree, and every other object at a degree differing 180 degrees from the first degree.

13. The conveyor belt system according to claim 1, wherein the control unit is configured to rotate each object of an object group entering the system, such that, the first object in every object group is rotated at the same degree of rotation as the last package in the previous object group.

14. The conveyor belt system according to claim 1 wherein the object is a package.

15. Method for turning packages in a conveyor assembly, said assembly comprising a first pair of conveyor belts being adjacent and having parallel conveying directions, the first pair of conveyor belts including a first pair of planar conveying surfaces forming an angle of less than 180 degrees, and a second pair of conveyor belts, being similarly adjacent and having parallel conveying directions, and where the second pair of conveyor belts are positioned downstream in alignment with the first pair of conveyor belts, wherein the belt speeds with each pair differs slightly such that a package entering the conveyor assembly is partly rotated in the first pair of conveyors and partly rotated in the second pair of conveyors, such that complete rotating is accomplished after the second pair of conveyors.

16. The method according to claim 15, wherein the object is a package.

17. A non-transitory computer program product stored on a computer-readable medium comprising software code adapted to perform the steps of the method according to claim 15 when executed on a data-processing apparatus.

18. A conveyor belt system for conveying at least one object along a conveying direction from an upstream location to a downstream location comprising:
   a first conveyor belt rotatable around a first pair of rollers;
   a second conveyor belt rotatable around a second pair of rollers, the second conveyor belt extending alongside the first conveyor belt along the conveying direction;
   a third conveyor belt rotatable around a third pair of rollers, the third conveyor belt being positioned downstream of the first conveyor belt;
   a fourth conveyor belt rotatable around a fourth pair of rollers, the fourth conveyor belt being positioned downstream of the second conveyor belt and extending alongside the third conveyor belt along the conveying direction; and
   a control unit configured to: (i) rotate the first conveyor belt at a different speed than the second conveyor belt to rotate the object as the object is conveyed along the conveying direction by the first conveyor belt and the second conveyor belt; and (ii) rotate the third conveyor belt at a different speed than the fourth conveyor belt to rotate the object as the object is conveyed along the conveying direction by the third conveyor belt and the fourth conveyor belt.

19. The conveyor belt system of claim 18, the first conveyor belt forming a first planar surface as the first conveyor belt rotates around the first pair of rollers, and the second conveyor belt forming a second planar surface as the second conveyor belt rotates around the second pair of rollers, the first planar surface forming an angle with the second planar surface of less than 180 degrees.

* * * * *